Inventors:
Roy W. Goranson
William A. Zisman
By Potter, Pierce & Scheffler
Attorneys.

Jan. 16, 1940.    R. W. GORANSON ET AL    2,187,541
ELECTRIC FIELD SENSITIVE DEVICE
Filed Oct. 8, 1938    2 Sheets-Sheet 2

Inventors:
Roy W. Goranson
William A. Zisman
By Potter, Pierce & Scheffler
Attorneys.

Patented Jan. 16, 1940

2,187,541

UNITED STATES PATENT OFFICE 2,187,541

ELECTRIC FIELD SENSITIVE DEVICE

Roy W. Goranson and William A. Zisman, Washington, D. C., assignors to Carnegie Institution of Washington, Washington, D. C., a corporation of the United States Application October 8, 1938, Serial No. 234,068

11 Claims. (Cl. 171—95)

This invention relates to a device sensitive to electric fields and to apparatus for detecting and measuring electric fields and for generating electromotive forces.

A principal object of the invention is the provision of a device whereby the direction and intensity of an electric field may be determined.

A further object of the invention is the provision of a device which will be affected by an electric field in a manner analogous to the effect of an electric field on a magnet.

Other objects and advantages of the invention will be apparent from the following discussion.

Broadly speaking, the electric field sensitive device of the invention comprises a plurality of monomolecular layers of polar molecules oriented in substantially parallel relation supported on a suitable base member. As will be more particularly explained hereafter, such a device when positioned in an electric field will be subjected to a torque which may be utilized for determining either the intensity or the direction of the field.

The invention will be more particularly described with reference to the accompanying drawings in which.

It has been found that by depositing upon a suitable base member a plurality of monomolecular layers of long chain polar molecules in which substantially every molecule in each of the layers is oriented in substantially parallel relation, a structure may be produced having a permanent electrical charge, and it has been further found that such a structure is sensitive to an electric field.

Figure 1:
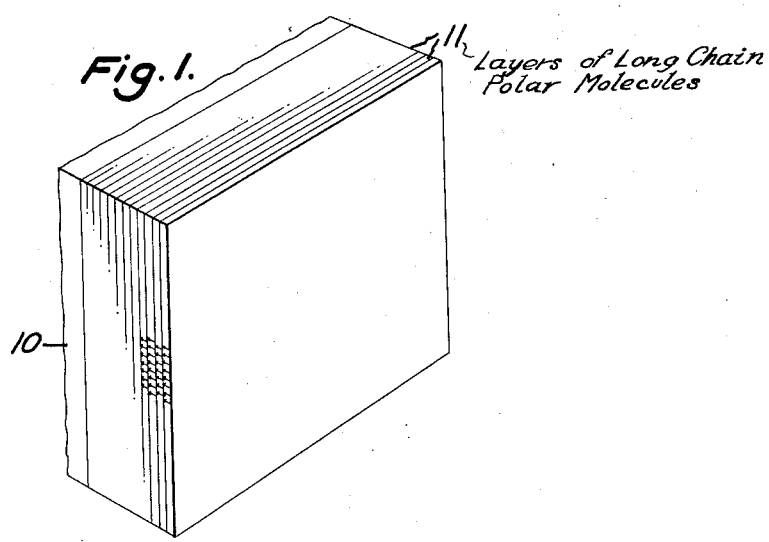
Fig. 1 is a diagrammatic representation on a greatly enlarged scale of a portion of a field sensitive element of the invention.

In Fig. 1, 10 represents the fragmentary surface of a supporting member, while 11 are the superposed layers of oriented long chain molecules. The oriented layers may be built up by depositing, one at a time upon the supporting member, successive layers of a monomolecular film of a long chain polar substance under conditions such that the multilayers have a permanent electrical charge, probably arising from the adsorption of electrically charged particles, such as electrons or ions. A suitable method for effecting the deposition of multilayers has been described by Blodgett in J. A. C. S., vol. 57 (1935), page 1007.

In general, effectively charged multilayers of fatty acid salts may be deposited by picking up successive monomolecular films by the technique described by Blodgett from aqueous substrata containing alkaline earth or other metallic salts, at hydrogen ion concentrations varying with the particular salt deposited, preferably being on the alkaline side for the alkaline earth salts.

Suitable long chain molecules for this purpose are organic molecules of considerable length having a polar group at one end, such as fatty acid salts, for example, calcium stearate, barium stearate and lead stearate. To produce elements of an effective degree of sensitivity, it is desirable to build up a rather large number of layers of oriented polar molecules, for example, 300 to 400 layers.

In order to obtain useful field sensitive elements of a high degree of sensitivity and uniformity of response, it is desirable to produce structures which are so designed that they have at least one plane of dissymmetry or unbalance, and a plane of symmetry normal to the plane of dissymmetry.

Figure 2:
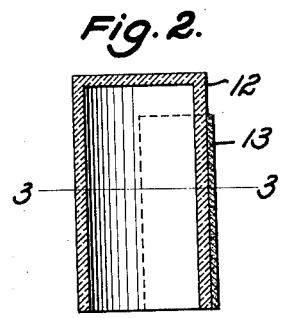
Fig. 2 is a sectional elevation of a field sensitive device of the invention.
Figure 3:
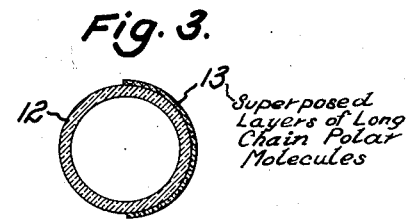
Fig. 3 is a section on line 3—3 of Fig. 2.

A useful sensitive element is illustrated in Figs. 2 and 3. In these figures, 12 is a supporting member consisting of a cylinder of insulating material of low dielectric constant, such as ebonite, cellulose acetate, methyl methocrylate resin, and the like. Supported on this member is a hemicylindrical multilayer 13 of oriented calcium stearate molecules, which is advantageously formed by depositing successive layers of oriented calcium stearate monomolecular layers on the outer surface of the cylinder 12, and thereafter removing one hemicylindrical half of the deposited multilayer by scraping or other suitable method.

Figures 4, 5:
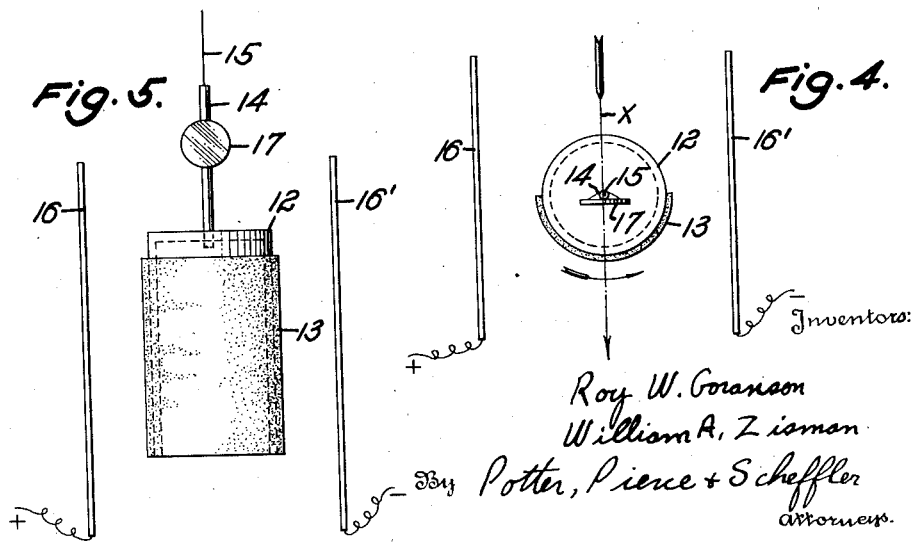
Fig. 4 is a diagrammatic plan view of an apparatus embodying the invention, whereby the intensity of an electric field may be measured.
Fig. 5 is an elevation of the apparatus of Fig. 4.

In the instrument shown in Figs. 4 and 5, the sensitive element of Figs. 2 and 3 is supported through connecting member 14 by a wire 15, of known torsional characteristics, between plates 16, 16' forming the positive and negative terminals, respectively, of an electric field. Mirror 17 affixed to supporting member 14 serves to measure the amount of rotation of the element in an electric field by reflecting a beam of light upon a suitable scale, not shown.

A hemicylindrical coating of 340 oriented layers of calcium stearate covering an area of 2.3 square centimeters on an ebonite cylinder, was suspended by a galvanometer suspension (torsion constant 0.16 dyne-centimeter per radian) between two parallel metal plates as illustrated in Figs. 4 and 5. The cylinder was positioned so that the polar axis X of the element was perpendicular to the field in the zero position. When a unidirectional potential of 100 volts per centimeter was applied across the plates, the cylinder rotated in the field in the direction indicated in Fig. 4, and gave a steady deflection of 16 centimeters on a scale one meter distant. When the field polarity was reversed, the cylinder rotated an equal amount in the opposite direction. On varying the potential applied across the plates, the magnitude of the deflection was directly proportional to the field intensity.

Figure 6:
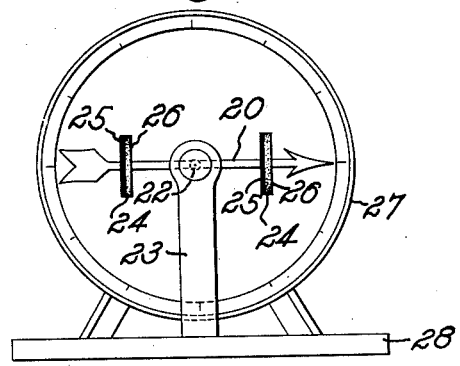
Fig. 6 is an elevation of an apparatus embodying the invention, whereby the direction of an electric field may be measured.
Figure 7:
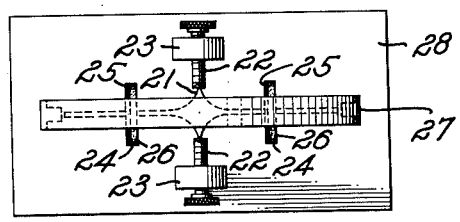
Fig. 7 is a plan view of the apparatus of Fig. 6.

The apparatus shown in Figs. 6 and 7 is particularly adapted for determining the existence and direction of an electric field. In these figures 20 is a needle pointer mounted for rotation about axis 21 supported by adjustable bearings 22 carried on posts 23. Mounted on needle pointer 20 are two unsymmetrically disposed field sensitive elements 24, 24 each comprising an insulating supporting member 25 and polarized multilayer 26. Surrounding the pointer 20 is a graduated circle 27 mounted on a suitable base 28.

This instrument is particularly suitable for the study of atmospheric electricity and for geophysical prospecting by determining the distortions in the electrostatic field near the surface of the earth.

Figure 8:
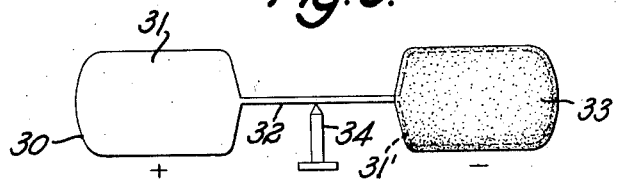
Fig. 8 is an elevation of a modified form of field sensitive element.
Figure 9:
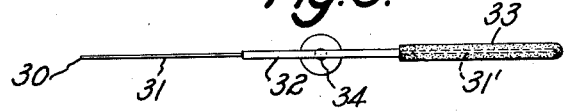
Fig. 9 is a plan view of the element of Fig. 8.

In the form of sensitive element shown in Figs. 8 and 9, a conductive support is utilized. Metallic member 30 consists of two plates or discs 31, 31' joined by a slender cylindrical central portion 32. An electrically charged multilayer 33 of oriented long chain polar molecules is deposited on one of the plate portions 31'. The element is mounted for rotation in a horizontal plane about supporting pivot point 34.

Due to the permanent charge of the multilayer, plate 31' acquires a negative charge and plate 31 a positive charge and the element is therefore sensitive to electric fields in which it is placed. When mounted as shown in the figures, it will indicate the horizontal component of an electric field. It may also be mounted, as in Figs. 6 and 7, to indicate the vertical component, and if mounted on a torsional support, as in Figs. 4 and 5, it may be used to determine the intensity of an electric field.

It should be noted that in all the figures the thickness of the polarized multilayer is necessarily greatly exaggerated for clearness of representation. Four hundred layers of calcium stearate will have a thickness of the order of $1 \times 10^{-5}$ cm.

We claim:

1. An electric field sensitive element comprising a base member and a plurality of layers of oriented molecules of a long chain polar substance thereon, said element having at least one plane of dissymmetry.

2. An electric field sensitive element comprising a base member and a plurality of monomolecular layers of a long chain polar substance thereon, the molecules of said substance in each of said layers being oriented in substantially parallel relation, said element having at least one plane of dissymmetry.

3. An electric field sensitive element comprising an insulating base member and a plurality of monomolecular layers of a long chain polar substance thereon, the molecules of said substance in each of said layers being oriented in substantially parallel relation, said element having at least one plane of dissymmetry.

4. An electric field sensitive element comprising a conducting base member and a plurality of monomolecular layers of a long chain polar substance thereon, the molecules of said substance in each of said layers being oriented in substantially parallel relation, said element having at least one plane of dissymmetry.

5. An electric field sensitive element comprising a base member and a plurality of monomolecular layers of a long chain polar substance deposited thereon under conditions effective to cause adsorption of charged particles by the monomolecular layers, said element having at least one plane of dissymmetry.

6. An electric field sensitive element comprising a cylindrical base member of insulating material and a plurality of hemicylindrical layers of oriented molecules of a long chain polar substance deposited thereon.

7. An electric field sensitive element comprising an extended conductive base member and a plurality of layers of oriented molecules of a long chain polar substance asymmetrically deposited thereon.

8. An instrument for determining the characteristics of an electric field comprising a field sensitive element including a base member and a permanently charged multilayer comprising a plurality of layers of oriented molecules of a long chain polar substance asymmetrically deposited thereon, means supporting said element for movement in an electric field, and means for ascertaining the movement of said element.

9. An instrument for determining the characteristics of an electric field comprising a field sensitive element including an insulating base member and a permanently charged multilayer comprising a plurality of layers of oriented molecules of a long chain polar substance asymmetrically deposited thereon, means supporting said element for movement in an electric field, and means for ascertaining the movement of said element.

10. An instrument for determining the characteristics of an electric field comprising a field sensitive element including a conducting base member and a permanently charged multilayer comprising a plurality of layers of oriented molecules of a long chain polar substance asymmetrically deposited thereon, means supporting said element for movement in an electric field, and means for ascertaining the movement of said element.

11. An instrument for determining the characteristics of an electric field comprising a field sensitive element including a base member and a permanently charged multilayer comprising a plurality of layers of oriented molecules of a long chain polar substance asymmetrically deposited thereon, torsional means supporting said element for movement in an electric field, and means for ascertaining the movement of said element.

ROY W. GORANSON.
WILLIAM A. ZISMAN.